J. J. STENSGARD.
AUTOMOBILE KNUCKLE.
APPLICATION FILED JUNE 18, 1918.
1,302,989.
Patented May 6, 1919.
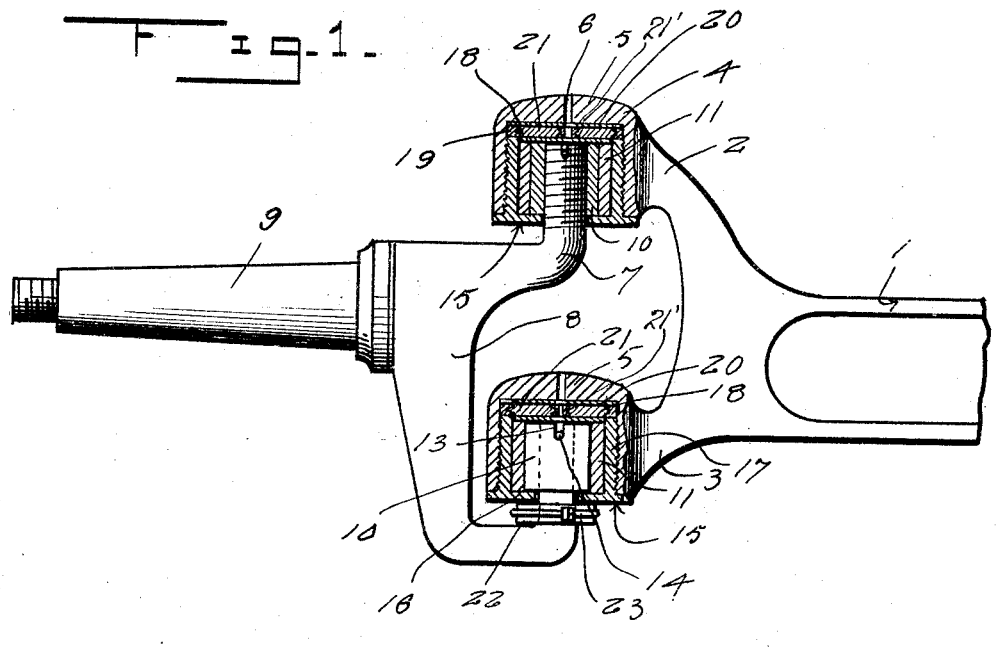
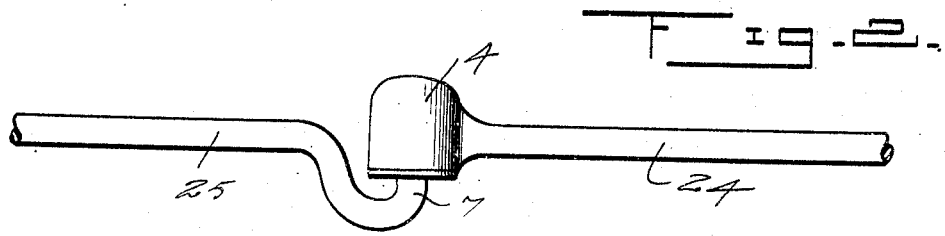
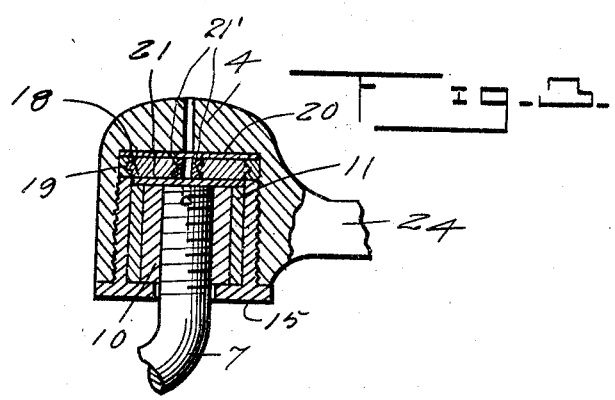
Inventor
J. J. Stensgard

UNITED STATES PATENT OFFICE.

JULIUS J. STENSGARD, OF WOODVILLE, WISCONSIN.

AUTOMOBILE-KNUCKLE.

1,302,989.  Specification of Letters Patent.  Patented May 6, 1919.

Application filed June 18, 1918. Serial No. 240,581.

*To all whom it may concern:*

Be it known that I, JULIUS JOHN STENS-GARD, a citizen of the United States, residing at Woodville, in the county of St. Croix and State of Wisconsin, have invented certain new and useful Improvements in Automobile-Knuckles; and I do hereby declare the following to be a full, clear, and exact description of the invention, such as will enable others skilled in the art to which it appertains to make and use the same.

This invention relates to improvements in automobile knuckles, and has for one of its objects the provision of a device of this character, which will be dirt-proof, oil retaining, easy working, and one in which the parts can be easily replaced and adjusted.

Another object of this invention is the provision of an automobile knuckle of the above-stated character, which is simple, durable and efficient, and which may be manufactured and sold at a comparatively low cost.

With these and other objects in view, as will become more apparent as the description proceeds, the invention consists in certain novel features of construction, combination and arrangement of parts, as will be hereinafter more fully described and claimed.

For a complete understanding of my invention, reference will be had to the following description and accompanying drawing, in which:

Figure 1 is a vertical sectional view of an automobile knuckle constructed in accordance with my invention, Fig. 2 is a side elevation of the knuckle used in connection with the steering rod or other like parts of an automobile, Fig. 3 is a fragmentary vertical sectional view of the knuckle.

Referring in detail to the drawing, the numeral 1 indicates the front axle of an automobile or motor vehicle, having formed at its ends upper and lower arms 2 and 3, which have cast integrally therewith bearing members 4. The bearing members 4 are disposed one over the other and arranged in spaced relation to each other, and are of substantially cylindrical formation, having their internal walls screw threaded. The upper ends of the bearing members 4 are closed by integral caps 5, provided with oil-receiving openings 6, adapted to receive the ordinary lubricating cup. The lower ends of the bearing members 4 are fully opened for receiving the vertically disposed arms 7 formed upon the spindle head 8, and which arms are disposed at right angles to the head 8. The head 8 carries the usual spindle 9 on which the wheel is journaled. The arms 7 are screw threaded, and have threaded thereon bearing sleeves 10, which are surrounded by bushings 11. The bearing sleeves 10 are provided with oppositely disposed notches 13 at their upper ends to receive locking pins 14, which extend through notches in the upper ends of the arms 7, whereby the bearing sleeves are locked to said arms. Nuts 15 are mounted upon the arms 7, and each consist of a disk 16, provided with a central opening to receive the arms 7, and have formed thereon externally screw threaded cylindrical portions 17, which surround the bushing 11, and are threaded into the bearing members 4, thereby securing the arms 7 within the bearing members as well as the bearing sleeves and bushings 11. The upper ends of the arms 7, bearing sleeves 10 and bushings 11 terminate short of the inner face of the integral closure 5, and have mounted thereon thrust plates 18. Disposed over the plates 18 and resting upon the upper ends of the nuts 15 are rings 19, supporting thrust disks 20, which engage the inner faces of the integral caps 5, and are provided with openings in registration with the oil-receiving opening 6. Positioned between the disks 18 and 20, and within the rings 19, are roller thrust bearings 21, adapted to take up the end thrust of the knuckle, and which are thoroughly lubricated by the lubricant received through the oil-receiving openings 6, thereby permitting the spindle head 8 to turn freely within the bearing members 4 and in relation to the axle 1.

The bearings 21 have their outer ends journaled to the rings while their inner ends are journaled to spacing members 21'.

If desired, a washer 22 constructed of felt or any other material suitable for the purpose, may be positioned upon the arms 7, and in engagement with the nuts 15 to prevent the leaking of lubricant from the knuckles. The washers are surrounded by suitable clamps 23.

Referring to Figs. 2 and 3, I have shown my improved knuckles used in connection with steering rods 24 and 25 of the automobile, in which the steering rod 24 has formed thereon a bearing member 4, while the rod 25 has formed thereon the arm 7, thus illustrating that my improved knuckle can be used at different points or connections upon an automobile or motor vehicle.

While I have shown and described the preferred embodiment of my invention, it will be understood that minor changes in construction, combination and arrangement of parts may be made without departing from the spirit and scope of the invention as claimed.

Having thus described my invention, what I claim is:

1. A knuckle comprising a bearing member having its lower wall open, an arm disposed in said bearing member, a bearing sleeve secured to said arm, a bushing surrounding said bearing sleeve, and means locking said bearing sleeve, bushing and arm within the bearing member.

2. A knuckle comprising a bearing member having its lower wall open and internally screw threaded, an arm disposed in said member, a bearing sleeve locked to said arm, a bushing surrounding said bearing sleeve, and a nut carried by said arm and threaded in the bearing member for securing the sleeve, bushing and arm in said bearing member.

3. A knuckle comprising a bearing member having its lower wall open, said bearing member having an oil-receiving opening in the top wall, an arm disposed in said bearing member, a bearing sleeve threaded to said arm, a pin locking said bearing sleeve to said arm, a bushing surrounding said sleeve, a disk carried by said arm, an externally screw threaded portion formed upon said disk and threaded in the bearing member, spaced disks in said bearing member, a ring disposed between the disks, and thrust bearings disposed between the disks within the ring.

4. An automobile knuckle including an axle and a spindle head, spaced bearing members formed upon said axle and having their lower walls open, angularly related arms formed on the spindle head and disposed within the bearing members, a bearing sleeve secured to the arms, bushings surrounding said sleeves, means locking the arms, sleeves and bushings in the bearing members, and means taking up end thrust between the sleeves, bushings and the top walls of the bearing members.

In testimony whereof I affix my signature in presence of two witnesses.

JULIUS J. STENSGARD.

Witnesses:
 JULIUS G. BEHM,
 S. A. HIMO.

Copies of this patent may be obtained for five cents each, by addressing the "Commissioner of Patents, Washington, D. C."